United States Patent [19]

Raseley et al.

[11] 4,214,883
[45] Jul. 29, 1980

[54] LIQUID-GAS SEPARATOR

[75] Inventors: LeRoy J. Raseley, Saylorsburg; Samuel J. Collier, Easton; Henry G. McCarty, Wind Gap, all of Pa.

[73] Assignee: Ecolaire Incorporated, Malvern, Pa.

[21] Appl. No.: 11,479

[22] Filed: Feb. 12, 1979

[51] Int. Cl.² .............................................. B01D 45/08
[52] U.S. Cl. ....................................... 55/426; 55/465; 55/185
[58] Field of Search .................................. 55/186–188, 55/192, 193, 201, 202, 206, 426, 462, 464, 465, 185

[56]       References Cited
U.S. PATENT DOCUMENTS

| | | | |
|---|---|---|---|
| 1,234,316 | 7/1917 | Elliott | 55/462 |
| 2,157,829 | 5/1939 | Metzgar | 55/465 |
| 2,742,976 | 4/1956 | Toth et al. | 55/455 |
| 3,306,009 | 2/1967 | Cruse | 55/201 |
| 3,477,208 | 11/1969 | Keller, Sr. | 55/218 |
| 3,795,088 | 3/1974 | Esmond | 55/206 |
| 3,926,594 | 12/1975 | Seib et al. | 55/465 |
| 4,002,432 | 1/1977 | Brice et al. | 55/188 |

Primary Examiner—David L. Lacey
Attorney, Agent, or Firm—Seidel, Gonda, Goldhammer & Panitch

[57]               ABSTRACT

The separator includes a spherical housing containing therewithin a baffle which obstructs direct flow between an inlet and an outlet. The inlet and outlet support the baffle which is comprised of two modular members connected end-to-end.

9 Claims, 5 Drawing Figures

LIQUID-GAS SEPARATOR

BACKGROUND

Liquid gas separators having spherical housings are known in the prior art. See U.S. Pat. Nos. 2,742,976 and 3,477,208. It is also known to suspend the baffle within the housing as taught by U.S. Pat. Nos. 1,234,316 and 3,916,594.

The customary design for a baffle of the type involved herein is to fabricate the same from flat plate or to cut the same from channel-shaped metal. I have found that various advantages can be attained if the separator is designed in a manner so as to eliminate machining and welds in connection with the baffle.

SUMMARY OF THE INVENTION

The liquid-gas separator of the present invention includes a generally spherical housing having a liquid-gas inlet and a gas outlet. The housing also includes a liquid outlet below the elevation of the gas outlet. A baffle is provided in the housing for obstructing direct flow from the liquid gas inlet to the gas outlet. The baffle is supported within the housing at one end by the liquid-gas inlet and at its other end by the gas outlet. The baffle includes two modular members connected together end-to-end.

It is an object of the present invention to provide a liquid-gas separator which simplifies the design of a baffle, simplifies assembly of the separator, and minimizes the number of inventory components while at the same time eliminating the need for machining or welding in connection with the baffle.

Other objects will appear hereinafter.

For the purpose of illustrating the invention, there is shown in the drawings a form which is presently preferred; it being understood, however, that this invention is not limited to the precise arrangements and instrumentalities shown.

Referring to the drawings in detail, wherein like numerals indicate like elements, there is shown a liquid-gas separator in accordance with the present invention designated generally as 10.

Figure 1:
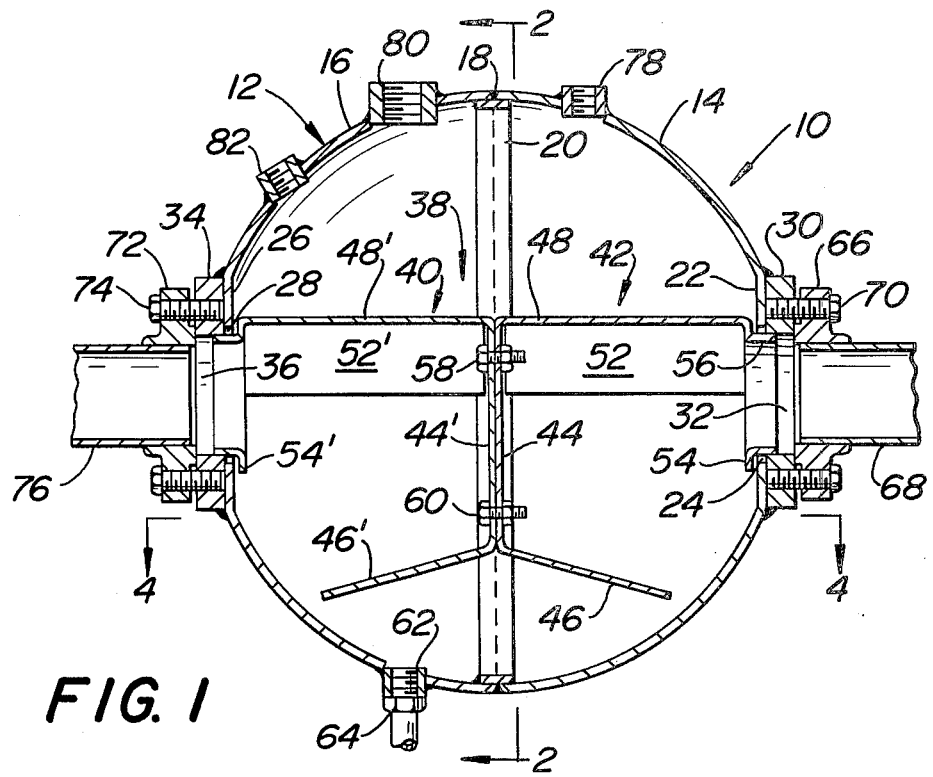
FIG. 1 is a longitudinal sectional view through a liquid-gas separator in accordance with the present invention.

The separator 10 includes a generally spherical housing 12 made from metal of a suitable thickness. A spherical design enables the thickness of the housing to be much less than it would be for a cylindrical housing at an equal design pressure. The housing 12 is comprised of modules 14 and 16 which are generally semi-spherical and welded together by weld 18. A ring 20 is tack welded to one of the modules such as module 16. Module 14 telescopes over the ring whereby the weld 18 can penetrate the entire wall thickness of the modules 14, 16.

Module 14 has a flat portion 22 containing an opening 24. Similarly, module 16 has a flat portion 26 containing an opening 28. A plate 30 is welded to the flat portion 22. Plate 30 has a bore 32 which is smaller than and coaxial with the opening 24. As shown in FIG. 1, plate 30 is thicker than the material of the module 14. A plate 34 is similarly welded to the flat portion 26. Plate 34 has a bore 36 coaxial with and smaller than the opening 28.

A baffle designated generally as 38 is suspended within the housing 12. The baffle 38 is comprised of modules 40 and 42 which are identical. Each of the modules 40, 42 is blanked and stamped from a single piece of material such as carbon steel or stainless steel. The modules 40, 42 are identical and connected end-to-end. Since the modules 40, 42 are identical, only module 42 will be described in detail with corresponding primed numerals applied to module 40.

Figure 2:
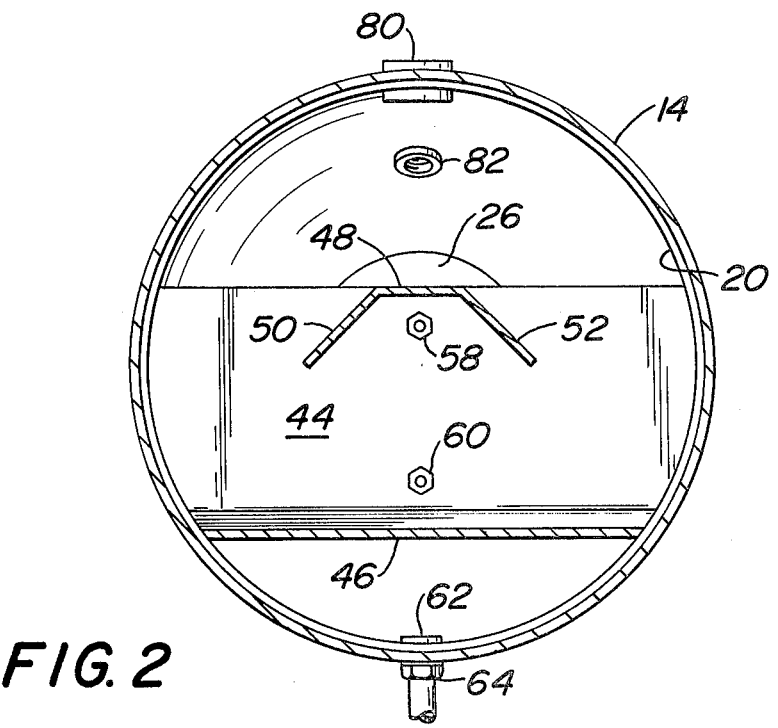
FIG. 2 is a sectional view taken along the line 2—2 in FIG. 1.
Figure 3:
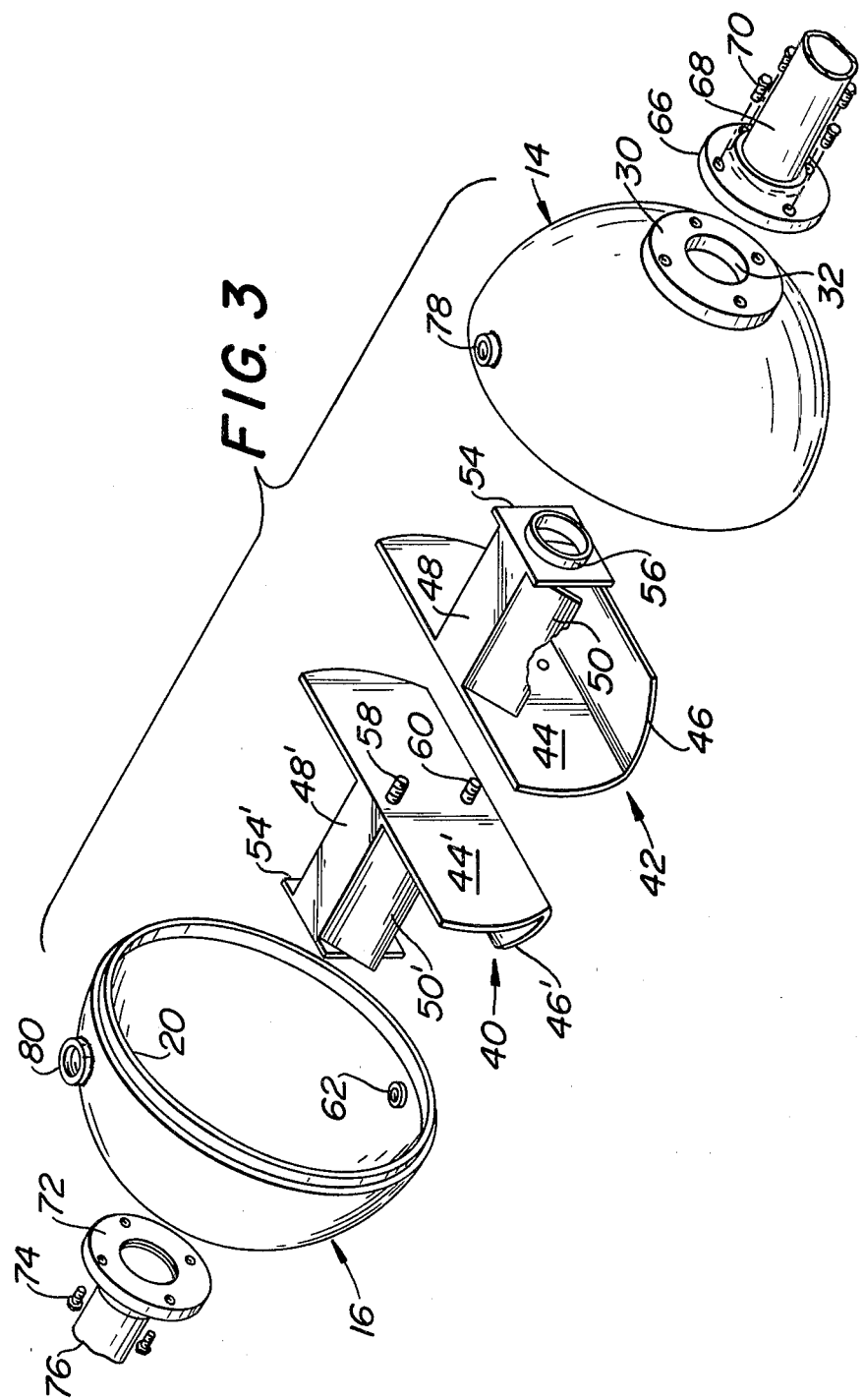
FIG. 3 is an exploded perspective view of the present invention.
Figure 4:
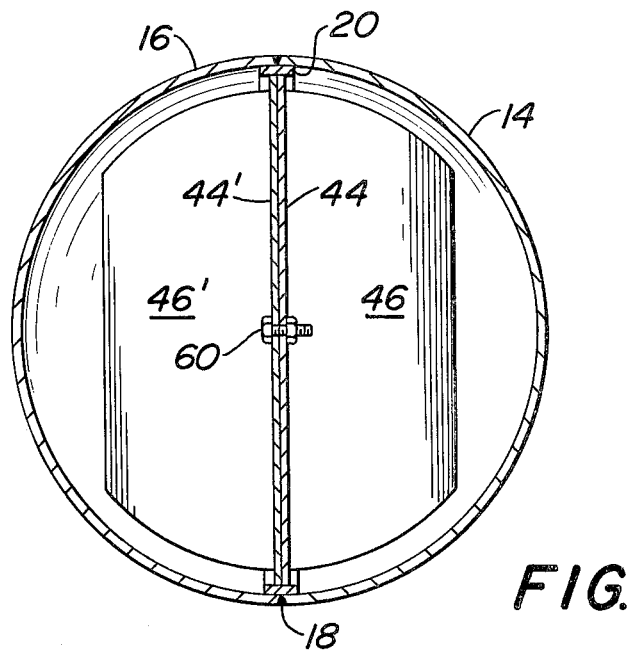
FIG. 4 is a sectional view taken along the line 4—4 in FIG. 1.

The module 42 includes a transverse wall 44 which interrupts direct flow from the bore 32 to the bore 36. At its lower end, wall 44 has an angularly disposed and downwardly extending lip 46. As shown more clearly in FIG. 2, the side edges of wall 44 and lip 46 are curved so as to mate with the inner periphery of the ring 20 and the inner periphery of modules 14 and 16. See FIGS. 3 and 4.

At its central portion, along the upper edge of the wall 44, there is provided a horizontally disposed top wall 48 which extends toward the flat portion 22. The top wall 48 has downwardly and angularly extending flanges 50, 52 along its side edges. The flanges 50, 52 converge upwardly. See FIG. 2.

The end of top wall 48 remote from the wall 44 is enlarged so as to define a rectangular end wall 54. Wall 54 is parallel to wall 44 and perpendicular to the top wall 48. End wall 54 has a boss 56 projecting therefrom. The diameter of boss 56 is chosen such that it may telescope into the bore 32 and thereby suspend one end of the baffle 38. The other end of the baffle 38 is supported in a similar manner by bore 36. The baffle 38 is assembled by joining the modules 40, 42 end-to-end using fasteners 58, 60. The baffle 38 is then inserted into the housing 12 before the weld 18 is applied.

An opening 62 is provided on the lower portion of the housing 12 beneath the baffle 38 to facilitate drainage of liquid. A conduit 64 is connected to the opening 62 to facilitate continuous draining of liquid. A flange 66 on a conduit 68 is releasably connected to the ring 30 by way of fasteners 70. A flange 72 on a conduit 76 is releasably connected to the plate 34 by fasteners 74. The conduits 68 and 76 is coaxial. An advantage of the construction of the present invention is that either conduit 68 or 76 could be the inlet with the other being the outlet.

The housing 12 is preferably but optionally provided with a plurality of couplings that have been tapped with internal threads. Thus, coupling 78 may be provided and a pressure gauge may be connected thereto. A coupling 80 may be provided with a pressure relief valve connected thereto to relieve any excess pressure within the housing 12. Also, a coupling 82 may be provided for receiving a temperature measuring device such as a thermocouple. The couplings 78, 80 and 82 are optional and when provided are welded at their periphery to holes in the modules 14 and 16.

Assuming that conduit 68 is an inlet conduit, a gas stream containing undesired liquid is introduced into housing 12. The stream impinges on wall 44. The liquid separates from the gas stream and flows down lip 46 and accumulates in housing 12 below the baffle 38 and discharges via conduit 64. The lips 46, 46' on modules 40, 42 define a tortuous path so as to minimize any tendency of accumulated liquid becoming airborne again.

The gas stream flows outwardly beyond the lower edges of flanges 50, 52, then upwardly over the wall 44, then downwardly under the lower edges of the flanges 50', 52' on module 40 and then out through bore 36 to conduit 76.

Figure 5:
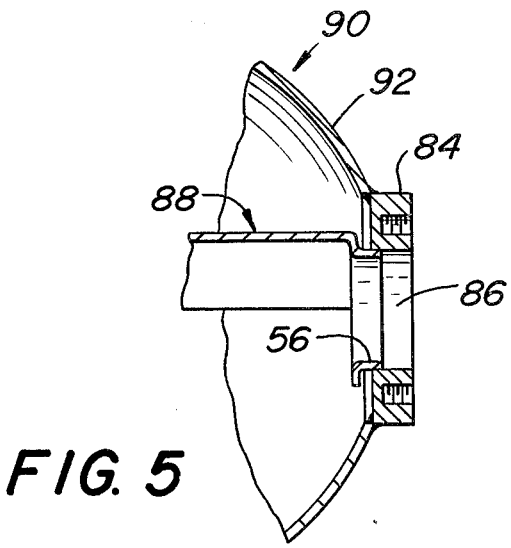
FIG. 5 is a sectional view of one end of another embodiment.

In FIG. 5, there is shown one end portion of another embodiment wherein separator 90 is identical with separator 10 except as is set forth hereinafter. In separator 90, each of the mating modules 92 lacks a flat portion such as the flat portions 22, 26. Instead, a plate 84 (comparable to plate 30) is welded at its periphery to module 92 around a hole therein. Plate 84 is substantially thicker than the wall thickness of module 92 so as to reinforce module 82. Plate 84 has a bore 86 for receiving and supporting one end of module 88. Thus, it will be noted that this embodiment provides economy in eliminating the steps necessary to provide flat portions 22, 26.

The present invention may be embodied in other specific forms without departing from the spirit or essential attributes thereof and, accordingly, reference should be made to the appended claims, rather than to the foregoing specification, as indicating the scope of the invention.

I claim:

1. A liquid gas separator comprising a generally spherical housing having a liquid-gas inlet opening coaxial with a gas outlet opening, a liquid outlet drain in said housing below the elevation of said openings, said housing having flat portions at diametrically opposite locations, each of said openings being in one of said flat portions, a discrete plate welded to the outer peripheral surface of said housing at each of said flat portions, each plate having a bore coaxial with the opening on the adjacent flat portion, a baffle in said housing, said baffle being suspended within said housing by said openings, said baffle including two identical modules, means connecting said modules end-to-end and said modules having side edges mating with juxtaposed surfaces in said housing.

2. A separator in accordance with claim 1 wherein each each of said modules includes a transverse wall interrupting direct flow between said openings, the transverse walls being at one end of the respective modules and being releasably coupled together by said connecting means.

3. A separator in accordance with claim 2 wherein each each of said modules includes an annular boss extending into one of said aligned openings, each of said annular bosses being connected to the transverse wall on its associated module by way of a top wall connected to the upper edge of the transverse wall associated therewith.

4. A separator in accordance with claim 1 wherein each each of said plates has a plurality of exposed tapped holes for connecting a flanged conduit thereto.

5. A liquid-gas separator comprising a generally spherical housing having a liquid-gas inlet, said housing having a gas outlet and a liquid outlet, the liquid outlet being below the elevation of the gas outlet, a baffle in said housing and obstructing direct flow from said liquid-gas inlet to said gas outlet, said baffle having one end supported by said liquid-gas inlet and its other end supported by said gas outlet, said baffle including two modular members, means connecting said members end-to-end, each modular member of said baffle including a transverse wall having an angularly disposed lip at its lower end, said lips converging upwardly toward an imaginary plane between the transverse walls of said modular members to define a tortuous path so as to minimize any tendency of accumulated liquid becoming airborne again, and said transverse walls being generally perpendicular to the axis of said inlet with arcuate ends mating with the interior surface of said spherical housing.

6. A separator in accordance with claim 5 including a first plate welded to said housing and containing the liquid-gas inlet, a second plate welded to said housing and containing the gas outlet, said plates being thicker than the wall thickness of said housing.

7. A separator in accordance with claim 5 wherein said connecting means secures said transverse walls together, and further comprising a top wall connected to the upper end of each of said transverse walls, one of said top walls extending toward said inlet and having side flanges extending downwardly from the side edges thereof, each top wall having an annular portion which is coaxial with and supported by one of said inlet and said gas outlet.

8. A separator in accordance with claim 5 wherein said spherical housing has a flat portion at opposite regions thereon, one of said flat portions containing said inlet, the other of said flat portions containing said gas outlet, a discrete of said plates welded to each of said flat portions, each of said plates having a thickness substantially greater than the thickness of the wall defining said spherical housing, each of said plates having a bore coaxial with the opening in the juxtaposed flat portion.

9. A separator in accordance with claim 8 wherein each of said plate is provided with threaded holes for receiving a fastener so that each of said plate may be joined to a flange on a conduit.

* * * * *